United States Patent
Varga et al.

(10) Patent No.: US 12,045,561 B2
(45) Date of Patent: Jul. 23, 2024

(54) SYSTEM AND METHOD FOR DISAMBIGUATING DATA TO IMPROVE ANALYSIS OF ELECTRONIC CONTENT

(71) Applicant: Theta Lake, Inc., Santa Barbara, CA (US)

(72) Inventors: Andrea Varga, Sheffield (GB); Sharon Huffner, Berlin (DE)

(73) Assignee: THETA LAKE, INC., Santa Barbara, CA (US)

( * ) Notice: Subject to any disclaimer, the term of this patent is extended or adjusted under 35 U.S.C. 154(b) by 0 days.

(21) Appl. No.: 18/070,202

(22) Filed: Nov. 28, 2022

(65) Prior Publication Data

US 2024/0176947 A1 May 30, 2024

(51) Int. Cl.
| | | |
|---|---|---|
| G06F 17/00 | (2019.01) | |
| G06F 40/166 | (2020.01) | |
| G06F 40/232 | (2020.01) | |
| G06F 40/253 | (2020.01) | |

(52) U.S. Cl.
CPC .......... *G06F 40/166* (2020.01); *G06F 40/232* (2020.01); *G06F 40/253* (2020.01)

(58) Field of Classification Search
CPC ..... G06F 40/166; G06F 40/232; G06F 40/253
See application file for complete search history.

(56) References Cited

U.S. PATENT DOCUMENTS

| | | | |
|---|---|---|---|
| 1,435,663 A | 11/1922 | Russell | |
| 6,490,549 B1 | 12/2002 | Ulicny | |
| 9,324,323 B1 * | 4/2016 | Bikel | G10L 15/197 |
| 10,311,855 B2 | 6/2019 | Yassa | |
| 10,380,210 B1 * | 8/2019 | Lai | G06F 16/3322 |
| 10,740,347 B1 * | 8/2020 | Wylie | G06Q 30/0639 |
| 2007/0179777 A1 * | 8/2007 | Gupta | G06F 40/237 704/9 |
| 2009/0164890 A1 * | 6/2009 | Zhu | G06F 40/232 715/257 |
| 2011/0153327 A1 | 6/2011 | Iasso | |

(Continued)

OTHER PUBLICATIONS

Pirinen, Tommi, and Krister Lindén. "Creating and weighting hunspell dictionariesas finite-state automata." Investigationes Linguisticae 21 (2010): 1-16. (Year: 2010).*

(Continued)

*Primary Examiner* — Andrew T McIntosh
(74) *Attorney, Agent, or Firm* — Sprinkle IP Law Group

(57) ABSTRACT

Systems and methods are disclosed for using natural language processing to generate sound-alikes and look-alikes for potentially relevant terms that could be mis-transcribed in a transcript. The disclosed framework combines the advantages of several measures aimed at tackling a wide range of transcription errors including but not limited to word boundary errors, phonetic confusion of words, spelling mistakes, grammatical errors, character drops, etc. In some examples, morphological similarity and phonetic similarity are used to address the word boundary errors and phonetic confusion of words. In some examples, a spell checker, word formation, and look-alike sound-alike generator are used to address errors such as phonetic confusion, spelling mistakes and grammatical errors. The generated sound-alikes can be ranked, which enables a flexible application of the generated phrases.

21 Claims, 7 Drawing Sheets

(56) References Cited

U.S. PATENT DOCUMENTS

| | | | |
|---|---|---|---|
| 2013/0080177 A1* | 3/2013 | Chen | G10L 15/183 |
| | | | 704/275 |
| 2014/0297266 A1* | 10/2014 | Nielson | A61B 5/165 |
| | | | 704/9 |
| 2014/0298168 A1* | 10/2014 | Son | G06F 40/232 |
| | | | 715/257 |
| 2015/0302848 A1* | 10/2015 | Kurata | G10L 25/51 |
| | | | 704/254 |
| 2017/0301340 A1 | 10/2017 | Yassa | |
| 2020/0135186 A1* | 4/2020 | Huang | G10L 15/02 |
| 2020/0349943 A1* | 11/2020 | Elangovan | H04M 1/271 |
| 2021/0141860 A1* | 5/2021 | Karagiannis | G06N 20/00 |
| 2021/0256036 A1* | 8/2021 | Luo | G06F 16/285 |
| 2022/0036883 A1* | 2/2022 | Tran | G06F 40/30 |
| 2022/0051127 A1* | 2/2022 | Jacobson | H04L 67/535 |

OTHER PUBLICATIONS

Lambert, Bruce L., et al. "Similarity as a risk factor in drug-name confusion errors: the look-alike (orthographic) and sound-alike (phonetic) model." Medical care (1999): 1214-1225. (Year: 1999).*

Newman, Rochelle S., Diane J. German, and Jennifer R. Jagielko. "Influence of lexical factors on word-finding accuracy, error patterns, and substitution types." Communication Disorders Quarterly 39.2 (2018): 356-366 (Year: 2018).*

Smith, Michael, Kevin T. Cunningham, and Katarina L. Haley. "Automating error frequency analysis via the phonemic edit distance ratio." Journal of Speech, Language, and Hearing Research 62.6 (2019): 1719-1723 (Year: 2019).*

Ciociano, Nestor, and Lucia Bagnasco. "Look alike/sound alike drugs: a literature review on causes and solutions." International journal of clinical pharmacy 36 (2014): 233-242 (Year: 2014).*

* cited by examiner

SYSTEM AND METHOD FOR DISAMBIGUATING DATA TO IMPROVE ANALYSIS OF ELECTRONIC CONTENT

TECHNICAL FIELD

The embodiments described herein relate to the field of natural language processing, and to the application area of phrase generation, ranking, and disambiguation of content to support the analysis of electronic communications data.

BACKGROUND

Organizations are increasingly concerned about the potential acceptable use issues of content, including without limitation for regulatory, compliance, privacy, cybersecurity, and HR issues that might be occurring in modern communications platforms like videoconferences, voice calls, chat, etc. Analyzing modern electronic communications data requires obtaining an accurate transcript of what was said or shared in the conversation, and then applying machine learning to those transcripts to identify relevant issues. However, to successfully analyze conversations to identify regulatory, compliance, cybersecurity, and other issues, systems may first analyze the transcripts of the conversation to normalize them and overcome to errors like misspellings and mis-transcribed words.

In many applications, a transcript is obtained using an automated speech recognition ("ASR") system. ASR systems have difficulties in incorporating contextual information that is dynamic and domain specific. Such information may contain domain specific terms, proper nouns, abbreviations, etc. When this contextual information is not covered in a training dataset, or it is pronounced similarly to other terms, the ASR system performs poorly. Specifically, for example, terms that sound similar to other terms ("sound-alikes") are often confused. The result is that transcripts generated from ASR systems are not accurate, which impedes the identification of specific issues or risks. Look-alike errors, where "interest" may be spelled "1terest" or "inter3st," and typos are also encountered in data from chat conversations on platforms such as Slack or Microsoft Teams as well as data obtained from optical character recognition ("OCR") systems.

Current solutions to mis-transcribed speech involve retraining ASR systems with newly obtained training data. The collection of training datasets that capture noise, multiple accents, and cover language ambiguities is often labor intensive and infeasible. Moreover, many downstream applications (such as risk detection) obtain ASR transcripts from 3rd party black-box ASR systems, which prevent accessing the models' training data and retraining it.

Other prior art tools use regular expressions in an attempt to solve the problem. However, the limitations of regular expressions render such solutions inadequate. Regular expressions are only useful for parsing certain types of text strings and have limited applicability for analysis of less structured content. In addition, regular expression-based models lack flexibility and ease of implementation due to the complexity of debugging efforts.

SUMMARY

A method is provided for disambiguating data, the method including receiving a set of pre-determined domain-relevant keywords and key phrases, receiving one or more word frequency lists, splitting compound words of the set of pre-determined domain-relevant keywords and key phrases into multiple components to generate a set of seed words, generating a set of sound-alike words for seed words in the set of seed words based on the generated set of seed words and the one or more word frequency lists, and ranking the set of sound-alike words to provide an indication of their respective relevance to the set of pre-determined domain-relevant keywords and key phrases.

Another embodiment provides a system including a memory, a processor, and a non-transitory computer readable medium storing instructions translatable by the processor, the instructions when translated by the processor perform: receive a set of pre-determined domain-relevant keywords and key phrases, receive one or more word frequency lists, split compound words of the set of pre-determined domain-relevant keywords and key phrases into multiple components to generate a set of seed words, generate a set of sound-alike words for seed words in the set of seed words based on the generated set of seed words and the one or more word frequency lists, and rank the set of sound-alike words to provide an indication of their respective relevance to the set of pre-determined domain-relevant keywords and key phrases.

Another embodiment provides a computer program product comprising a non-transitory computer readable medium storing instructions translatable by a processor, the instructions when translated by the processor perform, in an enterprise computing network environment: receiving a set of pre-determined domain-relevant keywords and key phrases, receiving one or more word frequency lists, splitting compound words of the set of pre-determined domain-relevant keywords and key phrases into multiple components to generate a set of seed words, generating a set of sound-alike words for seed words in the set of seed words based on the generated set of seed words and the one or more word frequency lists, and ranking the set of sound-alike words to provide an indication of their respective relevance to the set of pre-determined domain-relevant keywords and key phrases.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
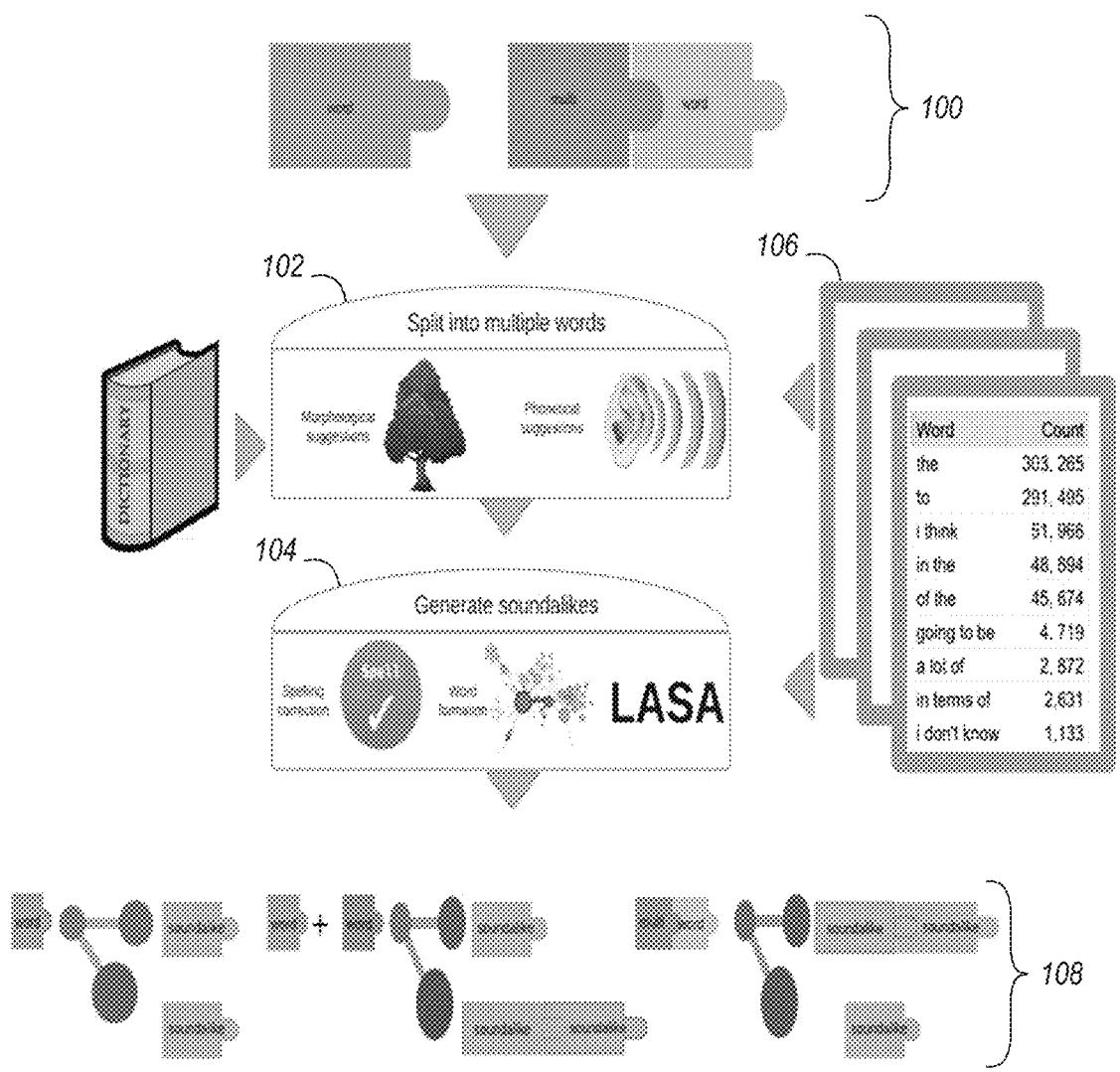
FIG. 1 is a diagram depicting an embodiment of an approach for generating look-alike and sound-alike words.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As mentioned above, organizations are increasingly concerned about the potential acceptable use issues of content, including without limitation for regulatory, compliance, privacy, cybersecurity, and HR reasons that might be occurring in modern communications platforms like videoconferences, voice calls, chat, etc. Embodiments relating to these concepts may be better understood with reference to commonly-owned U.S. patent application Ser. No. 17/741,528, entitled "SYSTEM AND METHOD FOR ANALYZING REALTIME DATA FROM HETEROGENOUS COLLABORATION PLATFORMS TO IDENTIFY RISK" by Nadir et al., filed on May 11, 2022, which is incorporated herein by reference in its entirety for all purposes.

To successfully analyze conversations to identify regulatory, compliance, cybersecurity, and other issues, systems may first analyze the transcripts of the conversation to normalize them and overcome to errors like misspellings and mis-transcribed words. Generally, the present disclosure describes systems and methods for using natural language processing to generate sound-alikes for potentially relevant terms that could be mis-transcribed in a transcript. The disclosed framework combines the advantages of several measures aimed at tackling a wide range of transcription errors including but not limited to word boundary errors, phonetic confusion of words, spelling mistakes, grammatical errors, character drops, etc. In some embodiments, morphological similarity and phonetic similarity are used to address the word boundary errors and phonetic confusion of words. In some embodiments, a spell checker, word formation, and look-alike sound-alike (LASA) generator are used to address errors such as phonetic confusion, spelling mistakes and grammatical errors. Note that the LASA generator is a new and novel generator created by combining multiple algorithms (described below). The generated sound-alikes (described below) are further ranked (e.g., according to a relevance score), which enables a flexible application of the generated phrases.

In some implementations, systems will receive transcripts of conversations from third party ASR system, i.e., a "black box" ASR. Typically, when using such ASR systems, training data that was used to train the ASR system is not available to the end user, so it can be difficult to detect and correct mis-transcribed words. As mentioned above, it is desired to search transcripts for potentially relevant terms. As described in more detail below, techniques are disclosed to automatically generate sound-alikes for the relevant terms that could be mis-transcribed in a transcript. In other words, the disclosed techniques take keywords and generates numerous candidate terms that could result from the mis-transcribed keywords. It would be nearly impossible for a human to manually generate such candidate terms, due to the complexity and mere number of potential ways that terms can be mis-transcribed. The techniques disclosed here solve the technical problems relating to mis-transcribed transcripts and enable a system successfully search for desired terms, even when mis-transcribed.

The concepts disclosed herein enable the correction of ASR transcripts or other text by generating confusing term pairs that can be attributed to high phonetic or orthographic similarity (e.g., phonetic similarly: "litecoin" and "light coin;" orthographic similarity: "rate" and "rite"; etc.). The disclosed framework is capable of generating such pairs for any given domain. In some embodiments, some of the framework's generators (morphology, word formation) rely on sole linguistic knowledge (e.g., the grammar of the relevant language—in the examples above, English) and static resources such as dictionaries, or Wordnet, a commonly used lexical database. The framework can also be tailored to specific domains, for example, by providing a word frequency list. As a result, using the systems and methods described herein, an ASR system can be tailored to new domains more quickly and more cheaply, since it avoids the need to collect large training data and to retrain the system for every new application domain.

As mentioned above, the concepts disclosed herein seek to facilitate the analysis of possibly erroneous transcripts by generating sound-alikes to pre-determined, domain-relevant keywords and key phrases. The resulting generated sound-alikes can be used to fine-tune the error correction model of an ASR system, and to facilitate downstream natural language processing (NLP) tasks.

The typical speech-errors made by an ASR system include, for example: word boundary errors (e.g., "a cross"→"across"), phonetic confusion of words (e.g., "light coin"→"lite coin"), spelling mistakes (e.g., "alternative"→"altnative"), character drops (e.g., "interest"→"interes"), grammatical errors (e.g., "interesting"→"interest"), etc. Other types of speech errors are also possible. Multiple factors contribute to these errors, such as: noise, accents, ambiguous word boundaries, lack of context, etc. Conversations are often recoded in noisy environments that have overlapping background conversations, microphone static, airplanes flying by, dogs barking, and other sources of noise. In addition, different people speak with different accents, and those accents affect various aspects of how they speak, including volume, pitch, and speed. Word boundaries in speech are sometimes ambiguous compared to those in written language. In written language words may be separated by spaces, commas, and other delimiters, whereas in speech, word boundaries are determined by context. Generally, conversations flow because people can fill in the blanks due to intrinsic contextual recognition. In the absence of context, however, it is difficult to tell the difference between two words that may sound similar. The approaches disclosed herein combine the advantages of several measures that aim to tackle the ASR errors mentioned above (and others).

FIG. 1 is a diagram depicting an embodiment of an overall approach for generating look-alike and sound-alike pairs. In the example shown, an input phrase 100 to the framework is an arbitrary length phrase that can consist of a single word, a multiword, or a combination of both. This input phrase 100 is split (102) into a sequence of adjacent words and passed to the various steps (104) (e.g., spell checker, work formation, sound-alike generator, etc. (described below)) to generate sound-alikes (108).

Below, an exemplary set of analysis methods and transformations that are applied to an input (word(s), phrase(s), etc.) are described in detail. In some embodiments, a first step involves constructing seed words from an input. In this example, a first transformation that we apply on the input words aims to address word boundary errors and phonetic confusion of words. In this example, two approaches are employed: one approach based on morphological similarity, and another approach based on phonetic similarity. In both cases, checks are performed to see if the input word is compounded, and if so, new seed words are generated by splitting the input word into its constituent parts.

Figure 2:
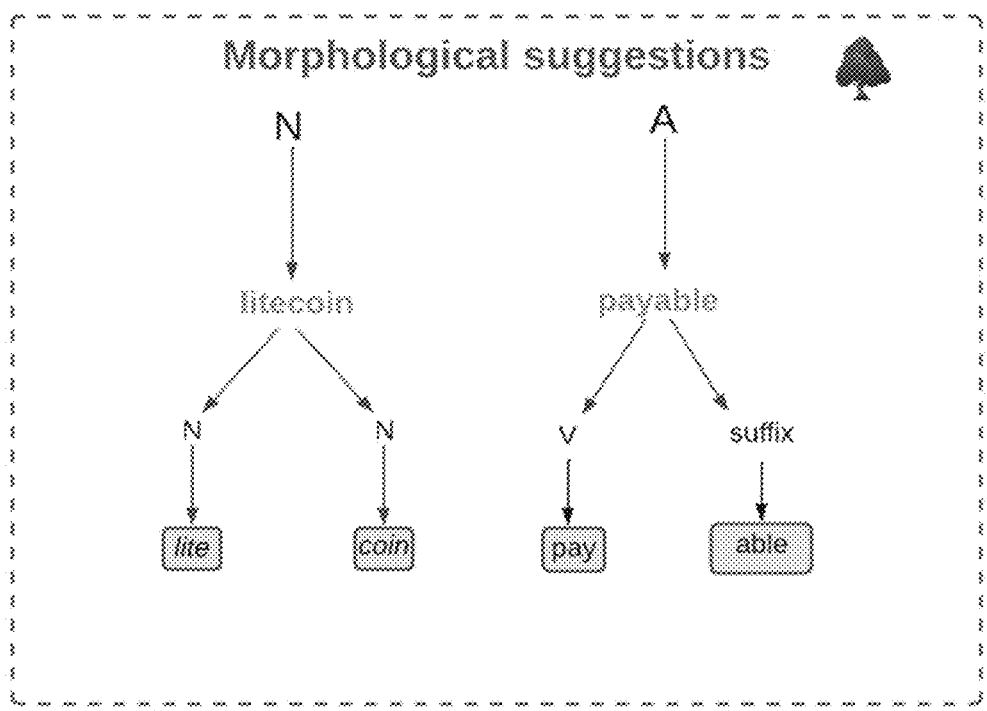
FIG. 2 is a diagram depicting how words are split by a morphological analyzer.

In some embodiments, a Hunspell morphological analyzer is used to separate compound words into their constituent morphemes, ensuring high morphological similarity between the input and generated words. This can be achieved by using Hunspell's manually created dictionaries that define how words break down into valid morphemes. FIG. 2 is a diagram depicting how words are split by the morphological analyzer. In the example shown in FIG. 2, the noun "litecoin" is broken down into nouns "lite" and "coin" and the adverb "payable" is broken down into verb "pay" and suffix "able" ("litecoin"→"lite coin"; "payable"→"pay able").

In some embodiments, the Double Metaphone phonetic measure is used to split compound words into multiple components, ensuring high phonetic similarity between the input and generated output words. The Double Metaphone phonetic encoding algorithm is a known algorithm that can return both a primary and a secondary code for a string, as one skilled in the art would understand. Splitting compound words into multiple components can be achieved by representing each word using a primary and a secondary encoding that captures the variations in pronunciations for that given word. A truncated encoding is created by retaining the first vowel in a word and replacing it with the letter "A", and by mapping the remaining consonants to a predefined set of 16 consonants OBFHJKLMNPRSTWXZ (where 0 stands for/T/ and X for /S/ or /tS/), as one skilled in the art would understand. The generated truncated encodings are then used to match sound-alikes for the input words. For example, the word "Instagram" is encoded using the primary encoding "ANSTKRM" and "eToro" is encoded using the primary encoding "ATR". On the other hand, words that have multiple variants will be encoded using both primary and secondary codes. For example, the primary code for the word "dogecoin" will be "TJKN", and a secondary code will be "TKKN."

To ensure the Double Metaphone algorithm has a good coverage, an additional word frequency list is used, which is fed into the algorithm (shown as word frequency list 106 in FIG. 1) to enable the generation of the most appropriate sound-alikes for the application domain. For reference, a word frequency list consists of frequency counts of adjacent words computed from spoken conversations. For example, if word frequency lists are computed over financial services conversations then the system will be able to generate more relevant sound-alikes/look-alikes specific to financial services. Similarly, if word frequency lists are computed over sports conversations then the system will get more relevant suggestions specific to sports, etc. In addition to generating new candidates, the word frequency list is also used to sort the suggestions returned by the Symspell algorithm (described below).

Figure 3:
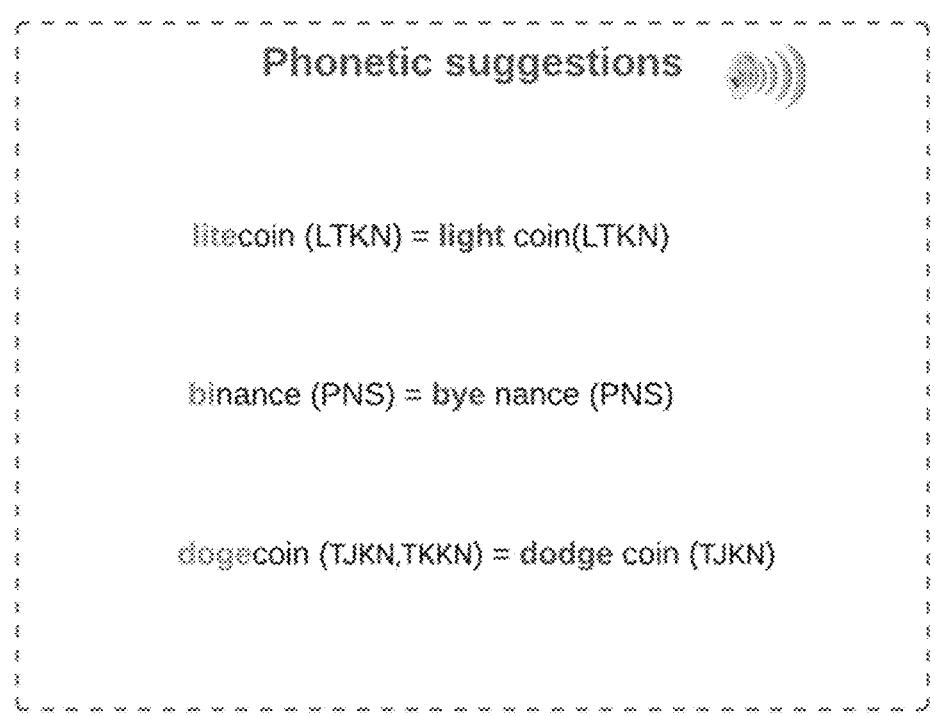
FIG. 3 depicts examples of how sound-alikes are generated using, as one example, the phonetic measure "lite coin" that will be mapped to "light coin."

The word frequency list consists of frequency counts of adjacent words (forming a maximum of three words, in some examples) computed from spoken conversations covering different English accents. FIG. 3 depicts an example of how sound-alikes are generated using the phonetic measure "lite coin" (LTKN) that will be mapped to "light coin" (LTKN). Similarly, "binance" (PNS) will be mapped to "bye nance" (PNS), and "dogecoin" ("TJKN", "TKKN") will be mapped to "dodge coin" ("TJKN").

In some embodiments, a second transformation step that can be applied in the framework tackles spelling mistakes, grammatical errors, and phonetic confusion of words. In this step the system takes the seed words generated by the first step and generates new sound-alikes for the seed words. In some embodiments, the output of three approaches are combined. The three approaches may include: a spell checker that employs a string-edit distance, a word formation module, and a new LASA generator (described below) that aims to find confusing sound-alikes.

The Symspell spelling correction algorithm is used to tackle the spelling mistakes made by an ASR system. The algorithm makes use of a word frequency list (the same list used by the Double Metaphone measure, consisting of frequency counts of adjacent words computed from spoken conversations), and looks up all strings within a maximum edit distance from that list in a very short time.

In some embodiments, the edit distance passed to Symspell based on the syntactic class of the input phrase can be set as follows:
 if the input phrase starts with a function word (e.g. "a gross", "a deposit"), then the edit distance is set to 1,
 if a phrase ends with a function word (e.g. "rate is," "profit of"), then the edit distance is set to 2,
 if a phrase contains function words only (e.g. "for the", "of the", "and so", etc.), the edit distance is set to 2, and
 if the phrase contains function words alone, then no candidate is returned, where function words are non-content words, such as prepositions, indefinite pronouns, conjunctions, pronouns, modal verbs, negated modal verbs.

Other configurations are also possible, as one skilled in the art would understand.

In addition to generating new candidates, the word frequency list is also used to sort the suggestions returned by the Symspell algorithm. For example, the higher the frequency of the suggestion, the higher the Symspell rank for that candidate.

Figure 4:
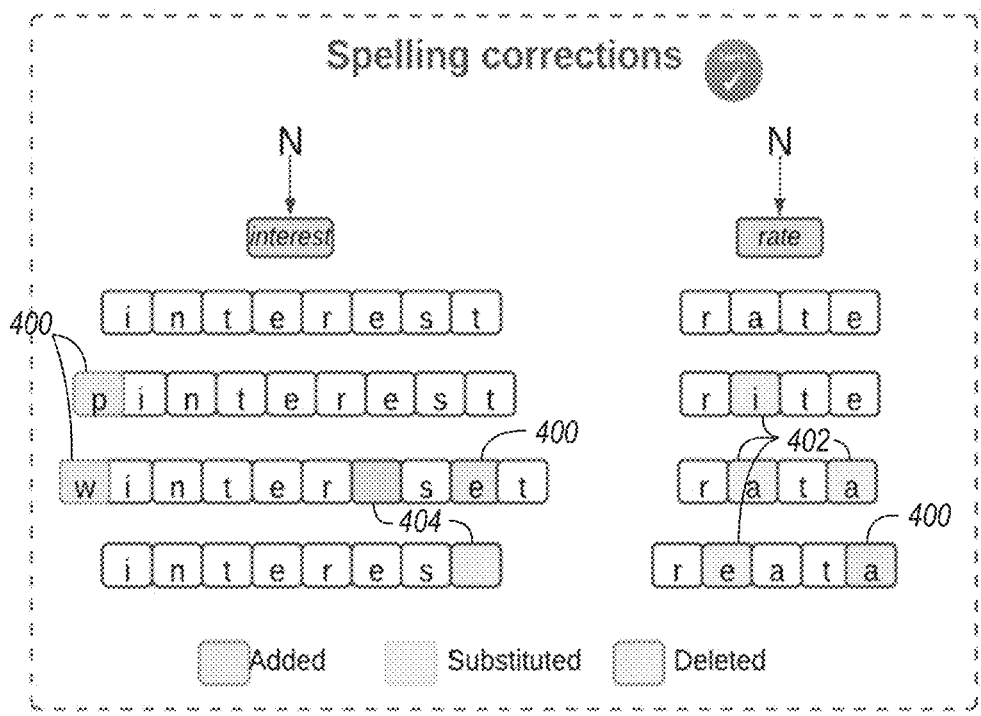
FIG. 4 is a diagram depicting the spelling corrections proposed for the exemplary phrase "interest rate."

The Symspell algorithm derives its speed in part by using the symmetric delete spelling correction algorithm, and by using an efficient prefix indexing. In the pre-calculation step, each string from the frequency list and their possible spell-checked suggestions are prefix indexed and stored in a dictionary. These new suggestions are generated using a delete-only edit candidate generation process, which relies on the number of delete operations required in transforming one string to another. This means all other transformations applicable on the input string, such as insertion, substitution, and transposition are first transformed into a delete operation, and then the delete counts are summed up. In some embodiments, the maximum delete-only edit distance can be set to two in the pre-calculation step. When a new input phrase is passed to the Symspell algorithm for spelling correction, the maximum edit distance can be set to either one or two, as explained above. FIG. 4 is a diagram depicting the spelling corrections proposed for the phrase "interest rate": "pinterest rite", "winterset rata", "interes reata". As shown by the shading (identified by numeral 400) in FIG. 4, the letters "p," "w," "e," and "a" are added to the phrase. As shown by the shading (identified by numeral 402) in FIG. 4, the letters "i," "a" (twice), and "e," are substituted in the phrase. As shown by the shading (identified by numeral 404) in FIG. 4, the letters "e" and "t" are deleted from the phrase.

In some embodiments, a Word formation Python module is used to tackle the grammatical errors made by the ASR system by generating all possible forms of a given word. This algorithm accepts as input a single word, which is not compounded. If the input phrase contains at least two words, then this generator can be executed for each word separately and the suggestions concatenated. This generator works by performing a series of word formation processes, such as verb conjugation, pluralizing singular forms, and connecting all parts of speech together through suffixation (or derivation). As part of the suffixation process, newly derived words can either change or maintain the class of the input word. For instance, in the following examples, the class of the word is changed:

the noun "creditor" is derived from the verb "credit" by appending the suffix "or" to the verb (creditor (n)=credit (v)+ or (suffix))

the verb "legalize" is derived from the adjective "legal" by appending the suffix "ize" to the adjective (legalize (v)=legal (adj)+ize (suffix))

the noun "shortness" is derived from the adjective "short" by appending the suffix "ness" to the adjective (shortness (n)=short (adj)+ness (suffix))

but maintained in the below examples:

the noun "friendship" is derived from the noun "friend" (n) by appending the suffix "ship" to the noun (friendship (n)=friend (n)+ship (suffix))

the noun "humanity" is derived from the noun "human" (n) by appending the suffix "ity" to the noun (humanity (n)=human (n)+ity (suffix))

Figure 5:
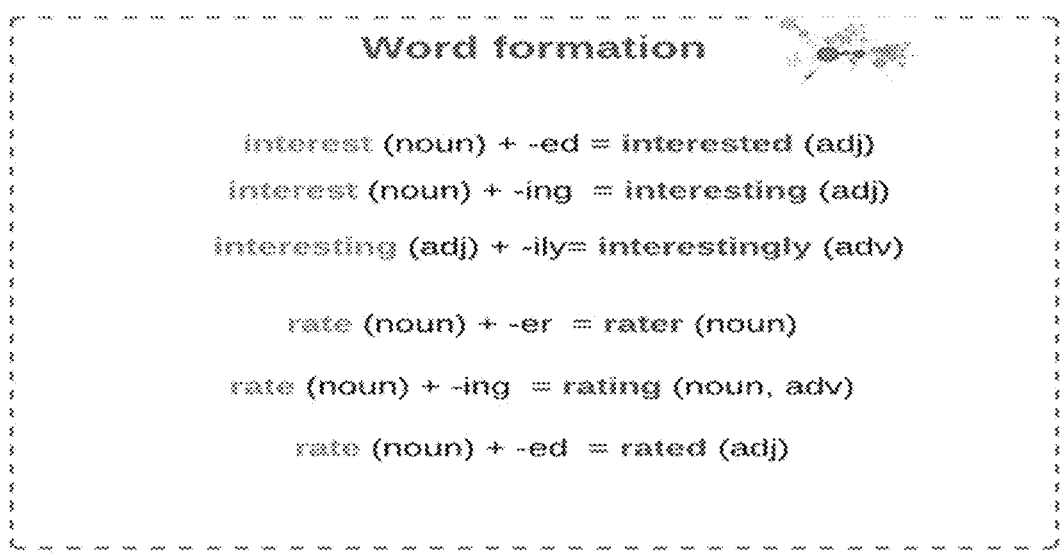
FIG. 5 is a diagram depicting inflections generated for the nouns "interest" and "rate."

FIG. 5 is a diagram depicting the inflections generated for the nouns "interest" and "rate."

Figure 6:
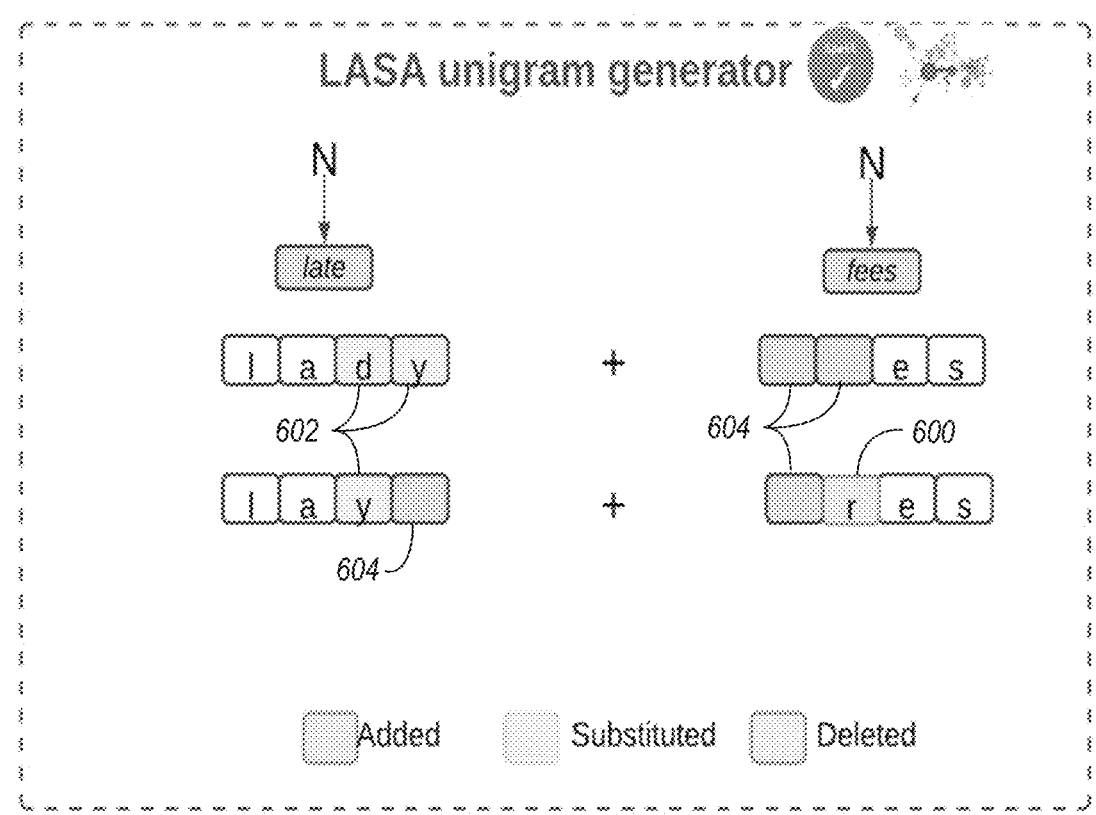
FIG. 6 is a diagram depicting an example of how sound-alikes can be generated using the LASA algorithm for the phrase "late fees."

The disclosed LASA algorithm aims to generate a single word from two consecutive words by proposing a specific blending technique over the words. This approach combines blending with the word formation grammar rules explained above to generate candidates that can look like or sound like the input phrase. In the first candidate generation step, each word is associated with its spell-checked candidates returned by the Symspell spell checker. Then for each such candidate, an attempt is made to blend the respective candidate with the next word by ensuring that the newly derived word can be obtained by inflecting the first word using word formation grammar rules (e.g., see FIG. 5). For instance, a new sound-alike/look-alike can be formed by cutting the base of the first word at the end, and the base of the second word from the beginning, and putting them together. FIG. 6 is a diagram depicting an example of how sound-alikes can be generated using the LASA algorithm for the phrase "late fees." First "late" and "fees" are passed to the Symspell algorithm (described above). This step generates "lady" and "lay" as candidates for "late", and "es" and "res" as candidates for "fees". Similar to the examples in FIG. 4, as shown by the shading (identified by numeral 602) in FIG. 6, the letters "d" "y" (twice) are substituted in the phrase "late". As shown by the shading (identified by numeral 600) in FIG. 6, the letter "r" is added to the phrase. As shown by the shading (identified by numeral 604) in FIG. 6, the letters "e" (twice) and "f" are deleted from the phrase. Next, these individual words can be blended together forming two new sound-alikes: "ladies" ("lady" +"es") and "layers" ("lay" +"res").

The list of sound-alikes generated in the previous steps can now be ranked. In some embodiments, each sound-alike receives a score that quantifies its relevance and can be used in downstream tasks (e.g., a tasks that require only very high-scoring sound-alikes).

The ranking of generated sound-alikes is a function of several quantities computed in previously described steps:

$$\text{score(input\_term, candidate)}=1-\text{phonetic\_score}-\text{frequency\_rank\_score}-\text{penalty\_score}.$$

This score provides a measure of how confident the system is that a candidate term is detected in a given transcript. In other words, In some embodiments, a threshold can be provided such that a score that reaches the threshold triggers to the system that the respective candidate term is matched in the transcript. In some embodiments, threshold values can be set empirically.

The phonetic score, responsible for capturing the phonetic similarity between the input term and the generated candidates. In one example, is computed as follows:

$$\text{phonetic\_score(input\_term,candidae)}=5*\text{dm\_distance(input\_term,candidae)},$$

where dm_distance is computed by computing the edit distance between the double metaphone encodings of the input term and the generated candidate with slight modifications. This modification involves discarding function words (non-content words), such as prepositions, indefinite pronouns, conjunctions, pronouns, modal verbs, negated modal verbs from the edit distance computation. The scaling 5 for the dm_distance has been set empirically.

The frequency_rank_score aims to capture the importance of generated sound-alikes based on the word frequency list (106) used by the LASA generator. In some embodiments, to achieve this, first the frequency is computed for each generated sound-alike. If the generated sound-alike is present in the word frequency list as a single term, then its frequency is taken directly from the word frequency list. Otherwise, if only parts of the generated sound-alikes are present in the frequency list (e.g., its individual words), then the frequency score for that sound-alike is estimated using the frequencies of its individual words. The frequency_rank_score is then computed by ranking each sound-alike by frequency, and dividing the rank by 10. This way, the most frequent sound-alike, ranked as 1 will have a score of 1/10=0, and the least frequency sound-alike (of rank 50, in the example implementation where only up to 50 sound-alikes generated by the framework are considered) a score of 50/10=5.

The final term in the score, penalty_score, aims to further penalize sound-alikes that generate verbs from a noun. The goal of using the penalty score account for words that sound the same, but mean different things. An example, of calculating a penalty score is outlined below.

penalty_score(input_term, candidate)=

Figure 7A:
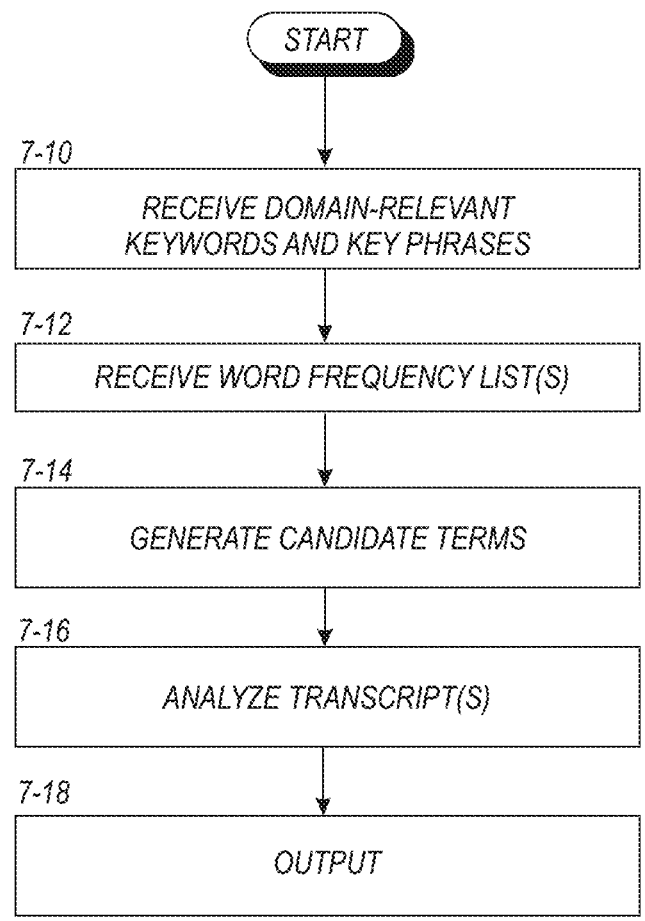
FIGS. 7A and 7B are flowcharts depicting examples of process flows for analyzing transcripts and for generating sound-alikes for the analyzation process.
Figure 7B:
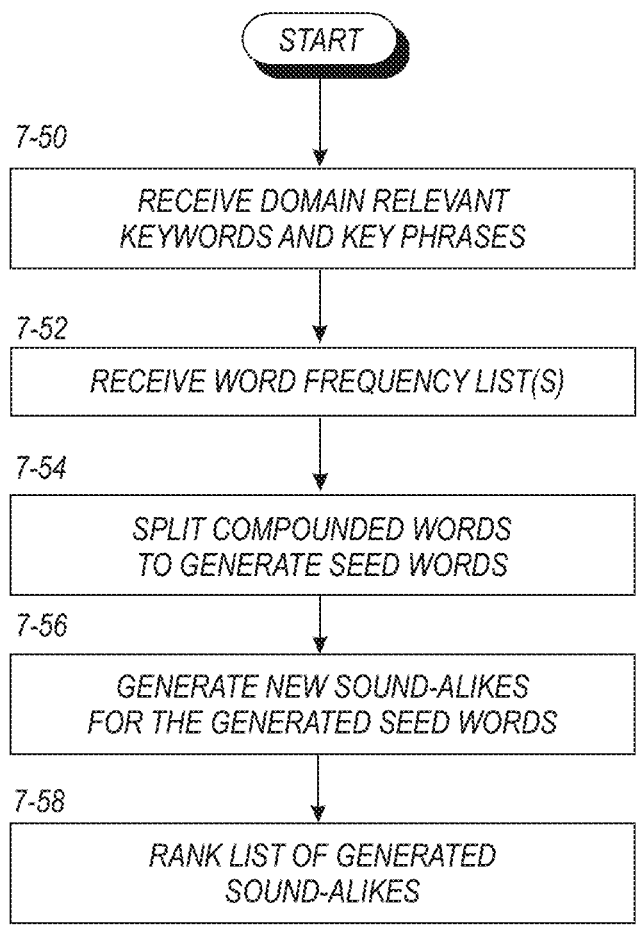

0.1, if a sound-alike was generated using WordForm, e.g. "installments"-"install", "creditor"-"credit", and the sound-alike became a verb from a noun as defined in a lexical database, such as WordNet 0.3 if a sound-alike was generated using Symspell only with edit distance=1, e.g. "billing"-"killing", "billing"-"willing", and the sound-alike became a verb from a noun as defined in WordNet FIGS. 7A and 7B are flowcharts depicting examples of process flows for analyzing transcripts and for generating sound-alikes for the analyzation process. FIG. 7A is a flowchart depicting an example of a process flow for analyzing a transcript(s) using candidate terms generated as described above. For the purposes of this description, FIG. 7A is described in the context of an exemplary downstream application that detects risks by analyzing ASR transcripts and detecting the occurrence of certain terms. The invention can be used for numerous other applications, as one skilled in the art would understand. As described above, the concepts described above seek to facilitate the analysis of possibly erroneous transcripts by generating sound-alikes to pre-determined, domain-relevant keywords and key phrases. At step 7-10, the pre-determined, domain-relevant keywords and key phrases are received by the system. At step 7-12, word frequency list(s) are received (described above). Note that receiving domain-relevant keywords and key phrases and receiving word frequency list(s) could occur in any order or simultaneously. At step 7-14, the system generates candidate terms. The generation of candidate terms is illustrated in more detail in FIG. 7B. Once the candidate terms are generated, the system can analyze transcripts to identify occurrences of the pre-determined, domain-relevant keywords and key phrases by searching for the keywords and sound-alikes and look-alikes determined by the system. In the example of analyzing conversations to identify regulatory, compliance, cybersecurity, HR, acceptable use, and other issues or risks, the analyzing step may include analyzing conversations to identify the occurrence of keywords associated with the relevant types of risks. Additional details of the analyzation step can be found in the document incorporated by reference above. At step 7-18 the system generates an output based on the analyzation at step 7-16. The output may comprise the identification (or lack thereof) of occurrences of the pre-determined keywords and their mis-transcribed equivalents. This may also include retrieving transcripts that contain the relevant risks, such as financial services, HR, etc. Note that, once the candidate terms are generated for a given input, the same candidate terms can be used in analyzing numerous transcripts, without re-generating the terms. However, it may be desirable to regenerate the candidate terms if, for example, the predetermined keywords change, the component algorithms are updated, etc., as one skilled in the art would understand.

FIG. 7B is a flowchart depicting an example of a process flow for generating sound-alikes for the analyzation process depicted in FIG. 7A. At step 7-50, the pre-determined, domain-relevant keywords and key phrases are received by the system. At step 7-52, word frequency list(s) are received. Note again that receiving domain-relevant keywords and key phrases and receiving word frequency list(s) could occur in any order or simultaneously. At step 7-54, any compounded words from the input (received at step 7-50) are split into new seed words. As described in detail above, this step may use items such as the Hunspell morphological analyzer and the Double Metaphone algorithm, for example. At step 7-56, new sound-alikes are generated for the input keywords and seed words. As described in detail above, this step may address spelling mistakes, grammatical errors, phonetic confusion of words, etc., in the transcript. In examples described above, this step may use items such as a spell checker that employs a string-edit distance, a word formation module, and a LASA generator that aims to find confusing sound-alikes. Spelling mistakes and grammatical errors in the transcripts may be address using the Symspell spelling correction algorithm, the Word formation Python module. In addition, the LASA algorithm may be used to generate single words from consecutive words. At step 7-58, the generated sound-alikes from step 7-56 are ranked using scoring formulas, such as those described in detail above.

Figure 8:
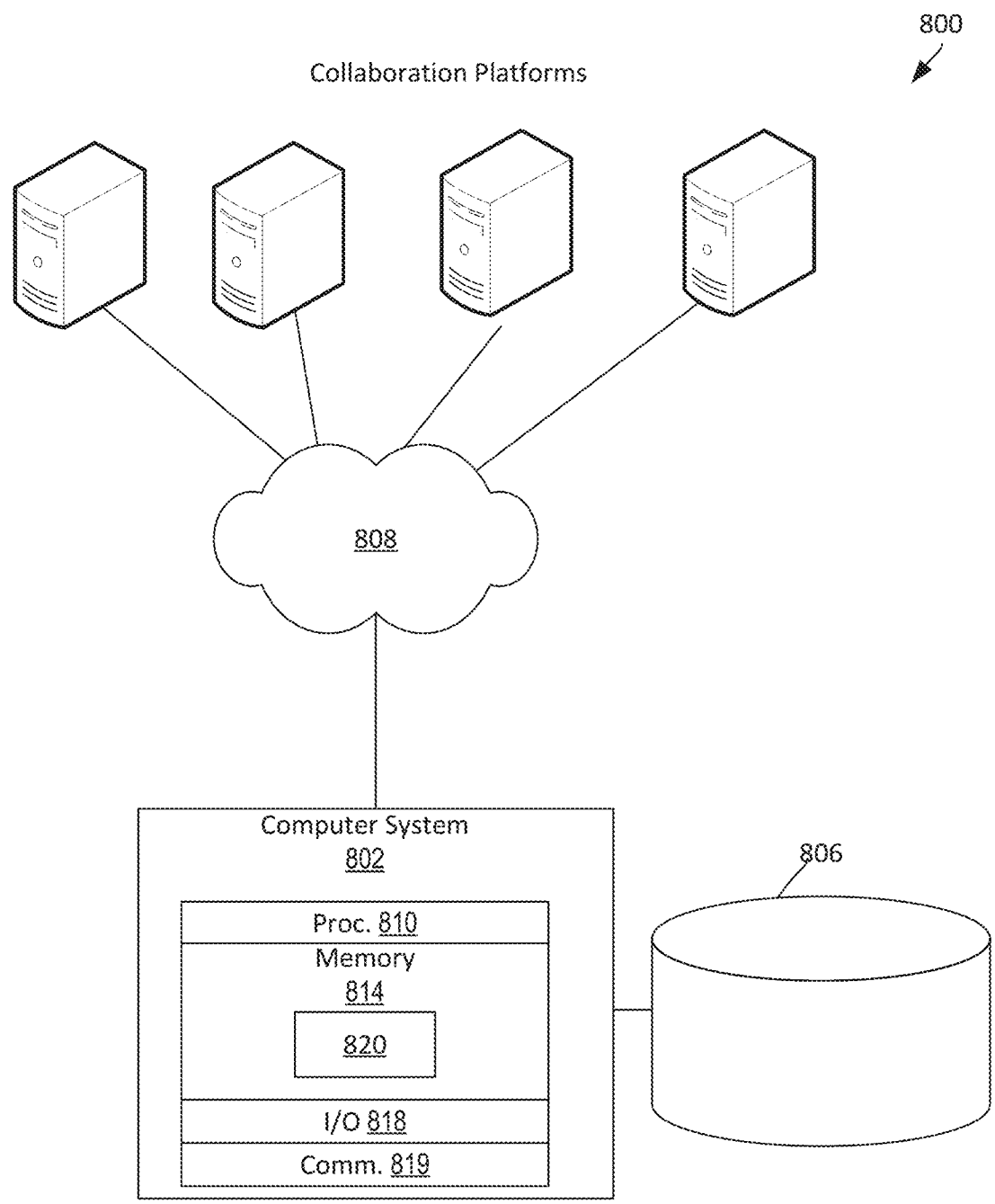
FIG. 8 is a diagrammatic representation of one embodiment of a network environment.

FIG. 8 is a diagrammatic representation of one embodiment of a system for disambiguating data to improve analysis of electronic content. The system may comprise one or more computer systems with central processing units executing instructions embodied on one or more computer-readable media where the instructions are configured to perform at least some of the functionality associated with embodiments of the present invention. In the illustrated embodiment, system 800 includes a computer system 802 having a computer processor 810 and associated memory 814. Computer processor 810 may be an integrated circuit for processing instructions. For example, computer processor 810 may comprise one or more cores or micro-cores of a processor. Memory 814 may include volatile memory, non-volatile memory, semi-volatile memory or a combination thereof. Memory 814, for example, may include RAM, ROM, flash memory, a hard disk drive, a solid-state drive, an optical storage medium (e.g., CD-ROM), or other computer-readable memory or combination thereof. Memory 814 may implement a storage hierarchy that includes cache memory, primary memory or secondary memory. In some embodiments, memory 814 may include storage space on a data storage array. Computer system 802 may also include input/output ("I/O") devices 818, such as a keyboard, monitor, printer, electronic pointing device (e.g., mouse, trackball, stylus, etc.), or the like. Computer system 802 may also include a communication interface 819, such as a network interface card, to interface with network 808, which may be a local LAN, a WAN such as the Internet, mobile network, or other type of network or combination thereof. Network 808 may represent a combination of wired and wireless networks that may be utilized for various types of network communications.

Memory 814 may store instructions executable by computer processor 810. For example, memory 814 may include code executable to provide an interface, such as an API or other interface to interface with heterogeneous online collaboration systems that may provide sources of transcription data. According to one embodiment, memory 814 may include code 820 executable to provide a computer system, for example, a data security platform. Data store 806, which may be part of or separate from memory 814, may comprise one or more database systems, file store systems, or other systems to store various data used by computer system 802.

Each of the computers in FIG. 8 may have more than one CPU, ROM, RAM, HD, I/O, or other hardware components. Portions of the methods described herein may be implemented in suitable software code that may reside within memory 814 or other computer-readable memory.

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

What is claimed is:

1. A method of for disambiguating data, the method comprising:
   receiving a set of pre-determined domain-relevant keywords and key phrases;
   receiving one or more word frequency lists;
   splitting compound words of the set of pre-determined domain-relevant keywords and key phrases into multiple components to generate a set of seed words;
   generating a set of sound-alike words for each seed word in the set of seed words based on the generated set of seed words and the one or more word frequency lists, wherein the set of sound-alike words includes single words derived from two consecutive seed words, wherein the set of sound-alike words are generated using a spelling correction algorithm employing a string-edit distance to address potential spelling errors made by a speech recognition system, and wherein the edit distance used by the spelling correction algorithm is based on a syntactic class of a respective input phrase; and ranking the set of sound-alike words to provide an indication of their respective relevance to the set of pre-determined domain-relevant keywords and key phrases.

2. The method of claim 1, wherein the compound words are split using a Hunspell morphological analyzer.

3. The method of claim 1, wherein the compound words are split using a double metaphone phonetic algorithm.

4. The method of claim 1, wherein the set of sound-alike words are generated using a word formation module to address potential grammatical errors made by a speech recognition system.

5. The method of claim 1, wherein the set of sound-alike words are generated using a look-alike sound-alike algorithm to generate single words from consecutive words.

6. The method of claim 1, further comprising analyzing a transcript of a conversation using the ranked set of sound-alike words to identify risks.

7. The method of claim 1, wherein the string-edit distance is set to 1 when the respective input phrase starts with a function word, the string-edit distance is set to 2 when the respective input phrase ends with a function word, and the string-edit distance is set to 2 when the respective input phrase contains only function words.

8. The method of claim 6, wherein the ranking further comprises calculating a score that quantifies a relevance of a respective sound-alike word.

9. The method of claim 8, wherein the respective sound-alike word is considered to be a match with a term in the transcript when the score reaches a threshold value.

10. The method of claim 6, wherein the ranking takes into account the grammatical correctness of a respective sound-alike word.

11. A system comprising:
a memory;
a processor; and
a non-transitory computer readable medium storing instructions translatable by the processor, the instructions when translated by the processor perform:
receive a set of pre-determined domain-relevant keywords and key phrases;
receive one or more word frequency lists;
split compound words of the set of pre-determined domain-relevant keywords and key phrases into multiple components to generate a set of seed words;
generate a set of sound-alike words for each seed word in the set of seed words based on the generated set of seed words and the one or more word frequency lists, wherein the set of sound-alike words includes single words derived from two consecutive seed words, wherein the set of sound-alike words are generated using a spelling correction algorithm employing a string-edit distance to address potential spelling errors made by a speech recognition system, and wherein the edit distance used by the spelling correction algorithm is based on a syntactic class of a respective input phrase; and
rank the set of sound-alike words to provide an indication of their respective relevance to the set of pre-determined domain-relevant keywords and key phrases.

12. The system of claim 11, wherein the compound words are split using a Hunspell morphological analyzer.

13. The system of claim 11, wherein the compound words are split using a double metaphone phonetic algorithm.

14. The system of claim 11, wherein the set of sound-alike words are generated using a word formation module to address potential grammatical errors made by a speech recognition system.

15. The system of claim 11, wherein the set of sound-alike words are generated using a look-alike sound-alike algorithm to generate single words from consecutive words.

16. The system of claim 11, the instructions further comprising analyze a transcript of a conversation using the ranked set of sound-alike words to identify risks.

17. A computer program product comprising a non-transitory computer readable medium storing instructions translatable by a processor, the instructions when translated by the processor perform, in an enterprise computing network environment:
receiving a set of pre-determined domain-relevant keywords and key phrases;
receiving one or more word frequency lists;
splitting compound words of the set of pre-determined domain-relevant keywords and key phrases into multiple components to generate a set of seed words;
generating a set of sound-alike words for each seed word in the set of seed words based on the generated set of seed words and the one or more word frequency lists, wherein the set of sound-alike words includes single words derived from two consecutive seed words, wherein the set of sound-alike words are generated using a spelling correction algorithm employing a string-edit distance to address potential spelling errors made by a speech recognition system, and wherein the edit distance used by the spelling correction algorithm is based on a syntactic class of a respective input phrase; and
ranking the set of sound-alike words to provide an indication of their respective relevance to the set of pre-determined domain-relevant keywords and key phrases.

18. The computer program product of claim 17, wherein the compound words are split using a Hunspell morphological analyzer.

19. The computer program product of claim 17, wherein the compound words are split using a double metaphone phonetic algorithm.

20. The computer program product of claim 17, wherein the set of sound-alike words are generated using a word formation module to address potential grammatical errors made by a speech recognition system.

21. The computer program product of claim 17, wherein the set of sound-alike words are generated using a look-alike sound-alike algorithm to generate single words from consecutive words.

* * * * *